Jan. 14, 1964   J. E. PALMER   3,117,725
ROW CROP SPRAYER

Filed May 1, 1962   3 Sheets-Sheet 1

INVENTOR
JOHN E. PALMER

Jan. 14, 1964    J. E. PALMER    3,117,725
ROW CROP SPRAYER

Filed May 1, 1962    3 Sheets-Sheet 2

INVENTOR
JOHN E. PALMER
By
HIS ATTY

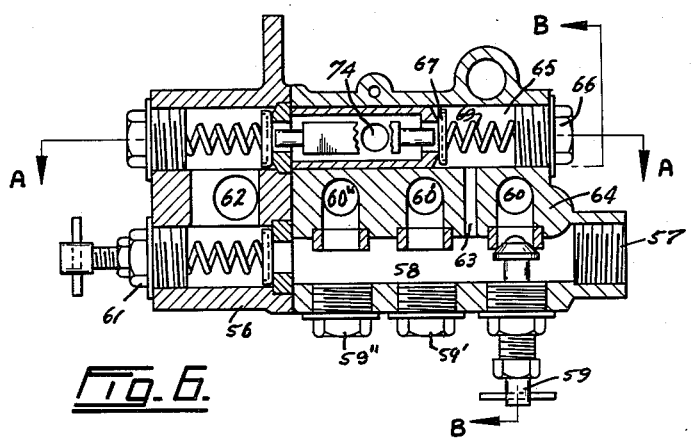
Fig. 6.
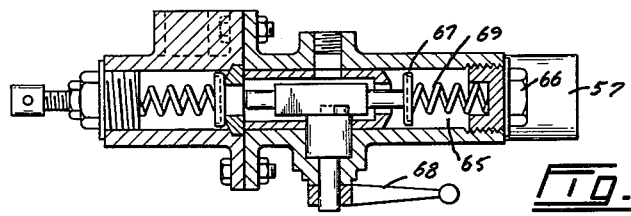
Fig. 7.
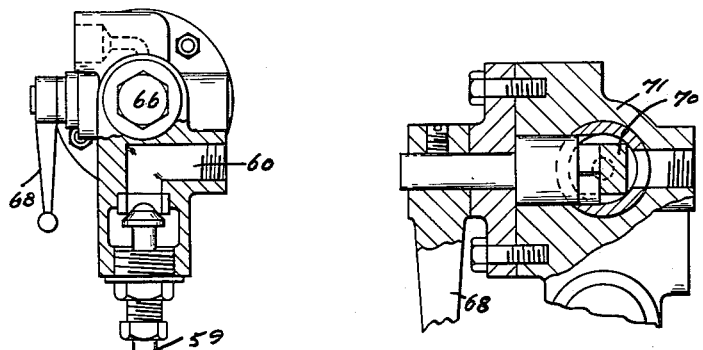
Fig. 8.
Fig. 9.
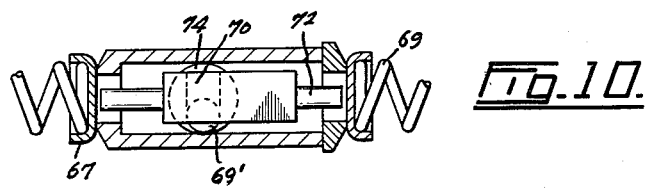
Fig. 10.

United States Patent Office 3,117,725
Patented Jan. 14, 1964

3,117,725
ROW CROP SPRAYER
John E. Palmer, Calgary, Alberta, Canada, assignor to Golden Arrow Manufacturing Limited, Calgary, Alberta, Canada
Filed May 1, 1962, Ser. No. 193,350
10 Claims. (Cl. 239—168)

This invention relates to new and useful improvements in row crop sprayers, more particularly of the type of sprayer used for the purpose of applying pesticide chemicals in row crop plants such as potatoes, corn, sugar beets and the like.

Conventional chemical spraying equipment has been used for many years and there is a wide variety of different chemicals used for different purposes. For example, chemicals are applied for killing insects for killing weeds, for defoliate purposes and the like. Irrespective of the chemical used, it is of significance to note that the most desired and effective application involve the need for close, even-knit spray patterns in the spray area in order to receive the full benefits of proper application.

The disadvantages of conventional type equipment is directly associated with the lack of facility to maintain a spray delivery that will provide the most desirable spray pattern. It is apparent that any departure from close, even-knit spray pattern (that is uneven application) will result in chemical under-dosage or overdosage, which in turn results in inferior pest control with subsequent loss of crops. In the case of weed killing herbicide applications, uneven applications can result in losses due to under-dosage to weeds and a further loss to the crop due to overdosage having regard to the fact that the majority of crops are susceptible to damage from overdosage of herbicide chemicals.

Furthermore row crop sprayer equipment is normally used in areas of valuable and high priced land and, as a result, the maximum amount of land area is cropped. Invariably the cropped lands are worked in close proximity to line fences or bordering crops and the like so that it will be appreciated that tillage, planting and spraying equipment and the like, require a headland or space in which to turn at the end of a field or end of crop row.

In the majority of cases, due to the conventional design, chemical spraying equipment covers a much wider swath than other types of implements normally used. Therefore in order to reduce the headland area to a minimum, it is most desirable to have the facility with wide coverage spray equipment to raise the booms at the row ends to clear fences or other obstructions prior to and during the turning around of the equipment. Many types of conventional sprayers are provided with means to raise and lower booms manually through the medium of ropes and pulley arrangements. However, it will be appreciated that there are several significant objections to this method.

Firstly the manipulation of ropes and the effort involved interfere with the operator at a time when he must also concentrate on maneuvering the equipment in the turning area.

Also due to the weight limitations involved with manually lifted booms, the construction of booms is restricted to a construction of a much less than the minimum structural requirements essential for good boom stability, and boom stability is a most important factor related to producing an even spray pattern.

Furthermore conventional type equipment commonly involves a construction of booms or wings, which are suspended and hang in parallel position by means of a flexible cable or chain mounted upon each side of the basic sprayer unit or center framework. The inner connecting ends of this type of suspended boom frame are usually fitted with a universal type joint which provides a facility for changing the angular attitude of the boom framework when the suspension cables are shortened or lengthened as the case may be, means being provided through a pulley arrangement or the like.

It will be apparent that the principal objection to this flexible means of suspension is that the boom framework is subject to a vertical bouncing motion when travelling over rough ground. A further objection must also be taken into account to the extent that drop pipes are normally connected to the boom framework, and in some instances the lateral section of suspended boom can also serve the purpose of the fluid carrier for dispensing the chemicals to the drop pipes which are connected to same through the medium of flexible hose connections. Under such circumstances it will be apparent that a pendulum-like lateral motion of the drop pipes will contribute a further unfavorable spray distribution.

Of course it will be appreciated that conventional hydraulic means can be incorporated in order to raise or lower the beams however such systems require the use of such relatively expensive components such as an individual pump, separate oil reservoir and operating valves. In addition this type of equipment as an accessory or optional equipment to conventional sprayer devices, would also involve additional driving mechanism.

My invention overcomes all of the principal objections aforementioned inasmuch as the boom construction incorporates a type of construction eliminating the need for flexible suspension type cables or chains inasmuch as the rigid tubular steel boom members are positioned in a manner that prevents vertical bounce. Furthermore means are provided to minimize the disadvantages of both vertical and horizontal motions and yet permits the booms to be raised or lowered vertically or to be swung rearwardly or forwardly in the horizontal plane.

The safety and fold back of the basic boom structure is accomplished by means of a spring loaded ratchet type clutch whereby, if the booms should be subject to interference by striking a post or the like, they would merely ratchet in a backward or forward direction as the need may arise.

The boom assemblies may be raised or lowered by the provision of a novel hinge joint in cooperation with a simple hydraulic piston and cylinder assembly which, in combination with a selector valve, permits the spray fluid to be utilized as the hydraulic fluid for raising or lowering the booms, so that the spray tank and spray pump may be utilized both for spraying and lifting as desired.

Furthermore by novel method of mounting the drop pipes resiliently, these drop pipes can be adjusted either vertically or laterally along the boom and furthermore, any pendulum action is prevented.

The principal object and essence of my invention is therefore to provide a device of the character herewithin described which permits an even spray pattern and yet at the same time incorporates means whereby the booms can be raised or lowered as desired.

Another object, in combination with the foregoing object, is to provide a device of the character herewithin described in which the desirable horizontal swinging action of the booms is retained in case they strike an obstruction.

Yet another object of my invention is to provide a device of the character herewithin described in which the spray fluid, tank and spray pump are utilized both for the spray nozzles and also for the raising and lowering the booms hydraulically thus eliminating the duplication of relatively expensive equipment.

Still another object of my invention is to provide a device of the character herewithin described which incorporates a novel interlock between the booms and the supports thereof whereby the forward and rearwardly swinging of the booms is prevented when the booms are raised.

Still another object of my invention is to provide a device of the character herewithin described which has improved stability, safety and versatile adjustment of the boom drop pipes Still another object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 6 is a transverse section of the selector valve per se.

FIGURE 7 is a view of FIGURE 6 substantially along the line A—A.

FIGURE 8 is a view of FIGURE 6 substantially along the line B—B.

FIGURE 9 is an enlarged sectional view showing the movable control piston.

FIGURE 10 is an enlarged sectional view of the control piston per se.

In the drawings like characters of reference indicate corresponding parts in the different figures.

Figure 1:
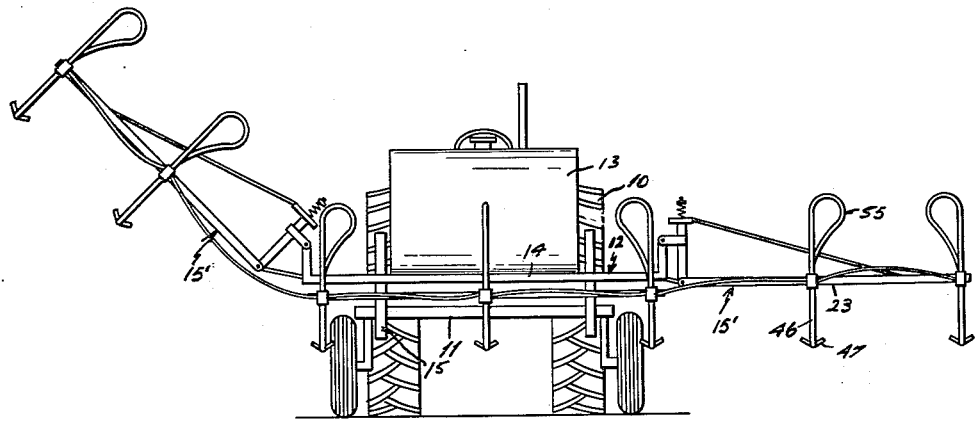
FIGURE 1 is a front elevation of my device mounted upon a source of power.

Proceeding therefore to describe my invention in detail, reference should be made to the accompanying drawings in which FIGURE 1 illustrates a wheeled vehicle 10 in the form of a tractor, having framework 11 on the rear end thereof carrying my row crop sprayer collectively designated 12.

The framework 11 provides room for the spraying fluid in the form of a storage tank 13 and carries an hydraulic pump (not illustrated) driven by the source of power.

Although the device 12 is shown mounted upon the rear of a framework 11 behind a tractor 10, nevertheless it will be appreciated that it can be bolted across the front of a conventional tractor using well known mounting means, such as bolts, U-bolts, brackets and the like.

The device 12 consists of a transverse main beam 14 secured to vertical members 15 in turn held by the framework 11.

Figure 2:
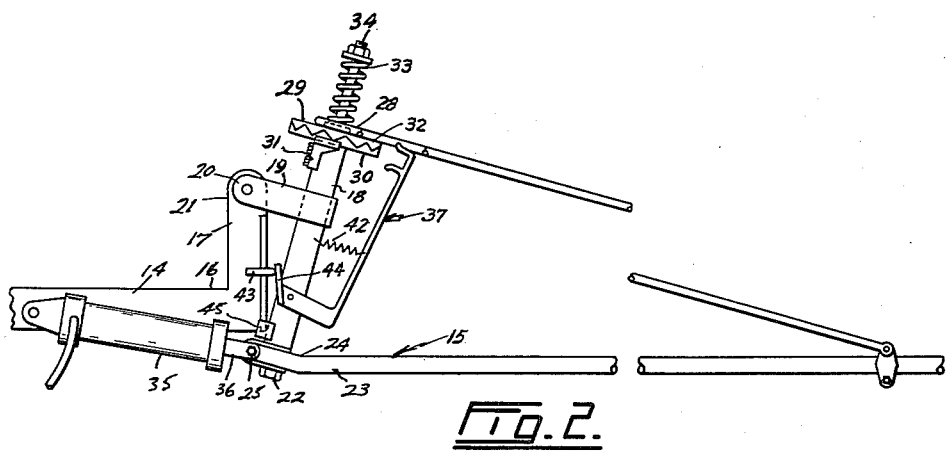
FIGURE 2 is a side elevation of the mounting of one boom to the main beam, said boom being in the lower position.
Figure 3:
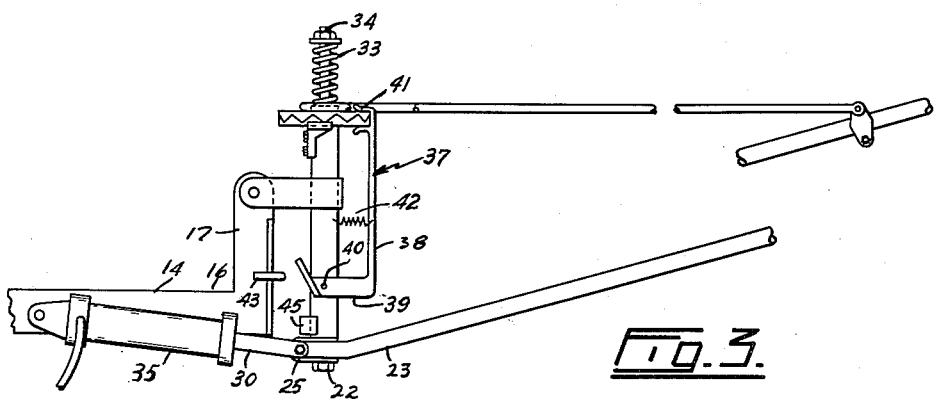
FIGURE 3 is a view similar to FIGURE 1 but showing the boom in the partially raised position.
Figure 4:
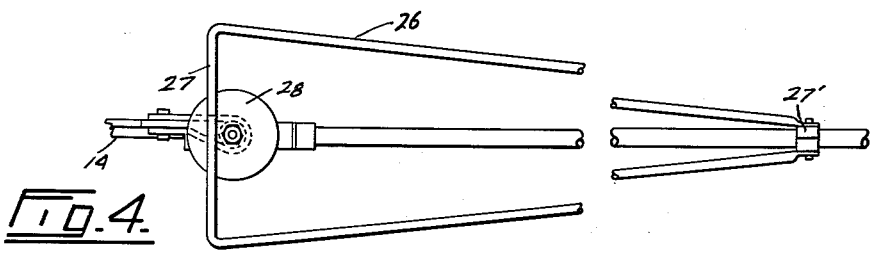
FIGURE 4 is a top plan view of FIGURE 2.

Upon either end of the main beam 14 boom assemblies collectively designated 15' are provided and details of the mounting of these boom assemblies is shown most clearly in FIGURES 2, 3 and 4.

Upon the extremities 16 of the main beam 14, I have formed a vertical post 17. A tubular member 18 is provided with an offstanding bracket 19 by which the tubular member is pivotally secured through pin 20, to the upper end 21 of the aforementioned vertical post 17.

A king pin 22 is bearably supported within tube 18 and a spray boom 23 is secured, by the inner end 24 thereof to the lower end of king pin 22 via clevis 25.

Torsion rods 26 extend between the ends of a cross member 27 and part way along the boom 23, being held by means of clamp 27' as clearly shown in FIGURES 2, 3, and 4.

The aforementioned cross member 27 is in turn secured to the upper plate 28 of a spring loaded ratcheted clutch assembly 29 cooperating between the upper end of tube 18 and the king pin 22.

The lower plate 30 of the clutch assembly is secured to the upper end of tube 18 by means of bracket 31. The two plates, which are in interfacial relationship, are serrated as at 32 and are held normally in the interfacial relationship by means of adjustable spring pressure due to spring 33 and bolt 34 engaging the upper end of the king pin 22.

From the foregoing, it will be appreciated that the boom assembly can be swung in the horizontal position against pressure of the spring loaded ratcheted clutch assembly, king pin 22 being mounted within tube 18 as hereinbefore described.

An hydraulic cylinder and piston assembly 35 is mounted by one end thereof to the main beam 14 with a piston rod 36 extending from the assembly and being pivotally secured to the boom adjacent the clevis 25.

From the foregoing it will be appreciated that extension of the piston and cylinder assembly will raise the boom around pivot pin 20 as illustrated in FIGURE 3.

However, it will be appreciated that it is desirable to restrict the horizontal swinging of the boom assembly, when said boom assembly is in the raised position in order to prevent damage occurring either to the equipment or to personnel which might be nearby when the device is being maneuvered. In order to accomplish this, I have provided a spring actuated lock assembly collectively designated 37 which consists of a bar 38 being right angulated at the lower end thereof to provide offstanding portion 39 by which the bar is pivotally secured to the tube at pivot 40.

A U-shaped clamp 41 is provided upon the upper end of the bar 38 and a spring 42 reacts between the bar and the tube 18 normally holding the bar inwardly, so that the U-shaped yoke 41 engages the plates 29 and 30 thus preventing them from overriding one another which effectively prevents pivotal movement of the boom in the horizontal position.

However, when the boom is in the normal spraying position shown in FIGURE 2, a pin 43 extends from the vertical post 17 of the beam 14 and engages an upstanding portion 44 secured to the portion 39 of the bar 38 thus holding the yoke 41 out of engagement of the ratcheted clutch assembly and against pressure of spring 42.

However, as soon as the boom starts to lift as shown in FIGURE 3, the portion 44 clears the pin 43 and permits the spring 42 to bring the yoke into engagement with the ratcheted clutch assembly as aforementioned. Finally it should also be observed that a U-shaped bracket 45 is secured to the lower end of tube 18, said bracket adapted to engage around the main beam 14 when the boom is in the spraying position thus further stabilizing the assembly and preventing undesirable movement occuring to the boom assembly.

Figure 5:
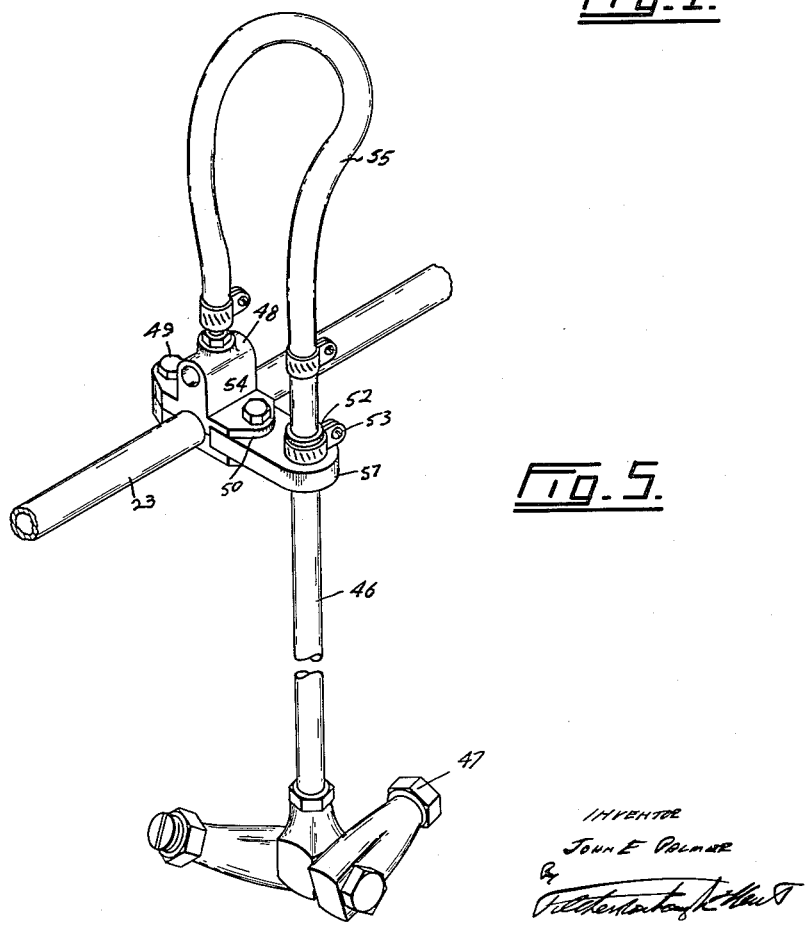
FIGURE 5 is a fragmentary perspective view of part of one of the booms showing my novel drop pipe assembly mounted thereon.

FIGURE 5 shows the detail of the mounting of the drop pipes 46 which carry conventional spray nozzles 47 upon the lower ends thereof.

A two-piece clamp 48 surrounds the boom 23 and is clampable transversely therealong by means of bolts 49 so that the entire drop pipe assembly is adjustable as to its position along the boom.

This clamp also holds by the inner end 50 thereof, a resilient drop pipe block which is apertured at the distal end 51 thereof. Formed around this aperture and extending upwardly therefrom is a boss or shoulder 52 also apertured and the drop pipe 46 slides within the boss and the aperture within the distal end 51, the vertical position of the drop pipe being controlled by means of a conventional clamp 53 surrounding the boss which can be tightened to the drop pipe.

In this embodiment, the upper portion 54 of the bracket 48 is drilled and acts as a manifold for the distribution of the spraying fluid to the drop pipe through the hose 55, further hose connections (not illustrated in FIGURE 5) extending between adjacent clamp assemblies.

From the foregoing, it will be appreciated that the drop pipe and hence the spray nozzles are adjustable vertically and horizontally but that the drop pipes are held in such a way as to eliminate undesirable pendulum-like motion occurring. At the same time, the resilient drop pipe block protects the drop pipes in the event that they strike the ground if said ground is uneven.

As mentioned previously, I incorporate the spraying fluid as my hydraulic fluid means for raising and lowering the booms and to this end I have designed a novel selector valve assembly shown in detail in FIGURES 7 and 10 inclusive.

The valve consists of a main body 56 having a drilling 57 at one end which is connected to the fluid pump (not illustrated).

Reference character 58 illustrates a pressure chamber within the body and 59 illustrates a manually operable valve which, when opened, permits the fluid to travel through a port 60 within the body which in turn extends to the drop pipes through conventional conduits. Further valves may be provided at locations 59′ and 59″ each operating their own ports 60′ and 60″.

The pressure to the drop pipes is controlled by means of an adjustable pressure relief valve assembly 61 situated at the end of the pressure chamber 58, excess pressure being by-passed through port 62 back to the storage tank.

The portions of the valve assembly hereinbefore described are conventional and are common to conventional sprayers for the distribution, pressure regulating and by-passing of the fluid.

However it is of significance to note that I have provided a lateral port 63 through a manifold partition 64 to a cylindrical drilling 65 formed also in the body of the valve.

This port is closed by means of a plug 66 at one end and by means of a valve 67 at the other, said valve normally being maintained in the closed position by means of spring 69 within the port 65.

A valve handle 68 extends through the body of the valve and is connected by means of an eccentric shaft mounting 69′ to a square cross section piston 70 riding within a cylindrical drilling 71. The square cross section of the piston gives bearing support by the corners thereof and also permits fluid to freely by-pass the piston.

This piston is provided with pins 72 upon either end thereof one of which may contact valve 67 and the other of which may contact a by-pass valve 73 which in turn communicates with the aforementioned by-pass port 62.

In operation, the by-pass valve 73 is set at a pressure above which it is not desired to operate the hydraulic cylinder and piston assemblies controlling the booms. By operating the control handle 68, valve 67 may be moved from its seat as shown in FIGURE 7 thus permitting fluid under pressure to be passed through lateral port 63, through valve 67 and hence to outlet port 74 from which conduits extend to the aforementioned hydraulic piston and cylinder assemblies 35, any excess pressure of the fluid by-passing through valve 73 which is spring loaded in a similar manner to valve 67.

However by rotating the valve the other way, valve 67 is closed by spring action and valve 73 is opened by the other of pins 72 on piston 70 thus permitting the weight of the booms to exhaust the fluid in the hydraulic piston and cylinder assembly, back through the tubing, through ports 74 and out of by-pass port 62.

It should be stressed that when valve 67 is moved from its seat then valve 73 is exposed to the available (relatively high) fluid pressure. However valve 73 is retained on its seat by virtue of the fixed spring tension which offers more resistance to valve 73 opening than the maximum pressure desired to lift the boom through the medium of hydraulic cylinders. However, it is of significance to note that the capacity of the hydraulic cylinders have been so designed that they come within the range of low pressure application, consequently low pressure fittings and hose, etc. can be used to economical advantage.

Due to the fact that the hydraulic piston and cylinder asssembly is in the low pressure environment, it is of further significance to note that actual spray applications are subject to much higher operating pressures. Therefore under the circumstances that there should be a higher pressure setting of regulator 61, it will become apparent that lower fixed spring pressure of valve 73 will automatically function and by-passing will occur at that point as hereinbefore described. In other words the unique arrangement provides for common by-passing as well as for a safety precaution against over pressuring the low pressure hydraulic system.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A row crop sprayer device adapted to be supported by a wheeled vehicle in association with a source of power and including a spraying fluid reservoir and a spray pump; said row crop sprayer comprising in combination a transverse main beam secured across said wheeled vehicle, at least one boom pivotally secured by the inner end thereof to one end of said main beam, means mounting said boom for pivotal movement in a vertical plane, and further means mounting said boom for movement in a horizontal plane, said first mentioned means including means cooperating between said boom and said securement, to lock said boom against said horizontal movement when said boom is raised, a plurality of drop pipes situated along said main frame and said boom, said drop pipes being adjustable vertically and adjustable laterally along said main beam and said boom, spray nozzles on the lower ends of said drop pipes, hose means extending from said drop pipes to said pump and selector valve means between said pump and said hose means adapted to control the route of said spray fluid.

2. The device according to claim 1 in which said means mounting said boom for pivotal movement in a vertical plane incorporates a vertically situated support post on said one end of said main beam, and a boom post assembly pivotally secured adjacent the upper end thereof to the upper end of said vertical support post, said boom post assembly including an outer tube, a king pin bearably supported therewithin, said boom being secured to the lower end of said king pin, torsion rods extending from part way along said boom to the upper end of said king pin, and a spring loaded ratcheted clutch assembly on the upper end of said tube and said king pin.

3. The device according to claim 2 which includes an hydraulic piston and cylinder assembly extending between said mean beam and the lower end of said tube, whereby extension of said hydraulic piston and cylinder assembly raises said boom, and fluid conducting hose extending between said hydraulic cylinder and said selector valve, said selector valve adapted to route said spraying fluid to said hydraulic cylinder and piston assembly.

4. The device according to claim 2 in which said means cooperating between said boom and said securement to lock said boom against said horizontal movement when said boom is raised, includes a bar pivotally secured to said tube between the ends thereof, a U-shaped yoke on the upper end of said bar adapted to embrace said spring loaded ratcheted clutch assembly whereby said spring loaded ratcheted clutch assembly is prevented from operating, spring means reacting between said bar and said tube normally biasing said yoke towards engagement thereof with said ratcheted clutch assembly and pin means secured to said vertical post on said main beam adapted to engage one end of said bar when said boom is in the lowered position thereby keeping said yoke out of engagement from said ratched clutch assembly against pressure of said spring means but releasing said yoke for engagement with said ratcheted clutch assembly when said boom is in the raised position.

5. The device according to claim 3 in which said means cooperating between said boom and said securement to lock said boom against said horizontal movement when said boom is raised, includes a bar pivotally secured to said tube between the ends thereof, a U-shaped yoke on the upper end of said bar adapted to embrace said spring loaded ratcheted clutch assembly whereby said spring loaded ratcheted clutch assembly is prevented from operating, spring means reacting between said bar and said tube normally biasing said yoke towards engagement thereof with said ratcheted clutch assembly and pin means secured to said vertical post on said main beam adapted to engage one end of said bar when said boom is in the lowered position thereby keeping said yoke out of engagement from said ratcheted clutch assembly against pressure of said spring means but releasing said yoke for engagement with said ratcheted clutch assembly when said boom is in the raised position.

6. The device according to claim 1 in which each of said drop pipes includes a clamp surrounding said boom or said main beam, said clamp being selectively positioned along the length of said boom or said beam, a resilient drop pipe block held by one side thereof, by said clamp, said drop pipe block being apertured upon the distal end thereof, an apertured resilient boss surrounding said aperture in said drop pipe and extending upwardly from one side thereof, said drop pipe extending downwardly through said boss and said aperture in said drop pipe block and clamp means surrounding said boss adapted to detachably secure said drop pipe within said block at the desired position.

7. The device according to claim 2 in which each of said drop pipes includes a clamp surrounding said boom or said main beam, said clamp being selectively positioned along the length of said boom or said beam, a resilient drop pipe block held by one side thereof, by said clamp, said drop pipe block being apertured upon the distal end thereof, an apertured resilient boss surrounding said aperture in said drop pipe and extending upwardly from one side thereof, said drop pipe extending downwardly through said boss and said aperture in said drop pipe block and clamp means surrounding said boss adapted to detachably secure said drop pipe within said block at the desired position.

8. The device according to claim 3 in which each of said drop pipes includes a clamp surrounding said boom or said main beam, said clamp being selectively positioned along the length of said boom or said beam, a resilient drop pipe block held by one side thereof, by said clamp, said drop pipe block being apertured upon the distal end thereof, an apertured resilient boss surrounding said aperture in said drop pipe and extending upwardly from one side thereof, said drop pipe extending downwardly through said boss and said aperture in said drop pipe block and clamp means surrounding said boss adapted to detachably secure said drop pipe within said block at the desired position.

9. The device according to claim 4 in which each of said drop pipes includes a clamp surrounding said boom or said main beam, said clamp being selectively positioned along the length of said boom or said beam, a resilient drop pipe block held by one side thereof, by said clamp, said drop pipe block being apertured upon the distal end thereof, an apertured resilient boss surrounding said aperture in said drop pipe and extending upwardly from one side thereof, said drop pipe extending downwardly through said boss and said aperture in said drop pipe block and clamp means surrounding said boss adapted to detachably secure said drop pipe within said block at the desired position.

10. The device according to claim 5 in which each of said drop pipes includes a clamp surrounding said boom or said main beam, said clamp being selectively positioned along the length of said boom or said beam, a resilient drop pipe block held by one side thereof, by said clamp, said drop pipe block being apertured upon the distal end thereof, an apertured resilient boss surrounding said aperture in said drop pipe and extending upwardly from one side thereof, said drop pipe extending downwardly through said boss and said aperture in said drop pipe block and clamp means surrounding said boss adapted to detachably secure said drop pipe within said block at the desired position.

References Cited in the file of this patent

UNITED STATES PATENTS

| 2,725,256 | Devost et al. | Nov. 29, 1955 |
| 3,043,519 | Tygart | July 10, 1962 |

FOREIGN PATENTS

| 160,111 | Australia | Dec. 3, 1954 |
| 929,747 | France | July 22, 1947 |